Feb. 28, 1950

F. R. ELDRIDGE, JR 2,498,881

LOAD MEASURING SYSTEM

Filed Aug. 2, 1947

INVENTOR.
*Frank R. Eldridge Jr.*
BY *Wm O. Morser*
*Atty.*

Feb. 28, 1950 F. R. ELDRIDGE, JR 2,498,881
LOAD MEASURING SYSTEM
Filed Aug. 2, 1947 6 Sheets-Sheet 4

INVENTOR.
Frank R. Eldridge Jr.
BY Wm C Moser
Att'y.

Feb. 28, 1950 F. R. ELDRIDGE, JR 2,498,881
LOAD MEASURING SYSTEM
Filed Aug. 2, 1947 6 Sheets-Sheet 5

INVENTOR.
Frank R. Eldridge Jr.
BY Wm C. Mower
Att'y.

Feb. 28, 1950     F. R. ELDRIDGE, JR     2,498,881
LOAD MEASURING SYSTEM Filed Aug. 2, 1947     6 Sheets-Sheet 6

INVENTOR.
Frank R. Eldridge Jr.
BY Wm O Moser
Att'y.

Patented Feb. 28, 1950

2,498,881

UNITED STATES PATENT OFFICE 2,498,881

LOAD MEASURING SYSTEM

Frank R. Eldridge, Jr., Springfield, Vt., assignor to Jones & Lamson Machine Company, Springfield, Vt., a corporation of Vermont Application August 2, 1947, Serial No. 765,735

9 Claims. (Cl. 73—133)

The present invention relates to a load measuring system for turning, boring and cutting elements of machine tools and the like. More particularly the invention relates to a load measuring system of the type referred to, which may be controlled and operated electrically, and has for its primary object to provide an improved method and means for deriving and translating electrical current, voltage or signal variations in response to mechanical load or stress applied to an operating or other load bearing element of a machine tool or the like in operation, as a measure of said load or stress in amplitude and duration.

It is also an object of this invention to provide a load measuring system which operates electrically to provide an indication or measure of mechanical load on a machine tool element in operation, and to derive and translate electrical current, voltage or signal variations in response to variations in one or more predetermined components of the load selectively or simultaneously, with respect to a common timing axis of reference.

While the invention is adapted for use in connection with machine tools for turning, boring, and cutting operations and particularly for load measurements on lathe tools, it is adapted for other uses where the mechanical loading of a structural element may be resolved into one or more components in predetermined planes.

It is also a further object of the invention, to provide an improved electrical load measuring system which may readily be applied to an operating element of a machine or mechanism which is subject to a variable mechanical load without interfering with the operation or use thereof, and which is adapted for remote control and indication of the load and selected components thereof.

In carrying out the invention, use is made of variable impedance or resistance elements which may be secured to the various surfaces of machine elements on which the load or stress is to be derived, for providing circuit controlling impedance variations responsive to variations in the load or stress.

A present preferred variable impedance or resistance device of the type above referred to is the well known electrical strain gage. As is known and well understood, such devices may be in the form of elongated flat strips of flexible insulating material adapted to be cemented or otherwise secured to structural surfaces, and enclosing resistance elements highly responsive in resistance variation to variations in mechanical stress tending to elongate, compress or otherwise deform the resistance element. For the purpose of describing the present invention, and as a preferred device for use in a system embodying the invention, variable resistance electrical strain gages will be referred to hereinafter, although other forms of variable impedance means may be employed in connection with a system embodying the invention.

In accordance with the invention, a pair of electrical strain gages for each load or load component to be measured is located with the strain gages in spaced relation to and on opposite sides of a plane normal to the axis of the load or load component to be measured, whereby the gages are placed in tension and compression inversely by load variations, thereby to provide an impedance or resistance change in magnitude and direction or sense corresponding to the direction and magnitude of the load.

Further in accordance with the invention, a pair of strain gages for each load or load component to be measured is connected in a balanced bridge circuit and arranged to control the flow of electrical current or signal energy to indicating, measuring or recording means in push-pull relation, thereby to magnify the control effect upon the system and the resultant measurement indication or record.

It is, therefore, a still further object of this invention to provide an improved electrically operated load measuring system having a balanced bridge control circuit for each load or load component to be measured, in which a pair of inversely variable resistance or impedance devices of the strain gage type, for example, are connected and operated in push-pull relation for imparting to each control circuit a magnified indication of said variable load or load component, together with means for translating the resultant inverse impedance or resistance variations into electrical voltages, currents or signal energy correspondingly varying in amplitude and sense for recording with respect to a uniform time variation axis, whereby the nature and magnitude of the load or load components may be determined.

It is also a further object of the invention to provide an electrical load measuring system which may readily be calibrated and which may be adjusted for response to a predetermined load or load component to effect a change in an operating condition of a machine to which it is applied. For example, in connection with the cutting tool of a lathe, an electrical system embodying the invention may separately, or in conjunction with its measurement function, cause the lathe to stop or may cause the feeding operation of the tool to stop when the cutting edge thereof becomes dulled to the point of ineffective operativeness. It may thus function as an automatic safety stop for machine tools when the load on any variably loaded element with which it is connected becomes excessive.

The invention further contemplates the effective application of strain gage or variable impedance devices to the measurement and control of tool loading in lathes and other turning and boring equipments, and has for its further object to provide an improved arrangement for mounting a turning or boring tool which is adapted for response to variations in the tangential, radial and longitudinal load or stress on the tool in operation, together with means for translating such load variations into electrical voltage, current or energy variations corresponding thereto, and suitably indicating or recording such variations as a measure of the magnitude and time duration thereof.

The invention will, however, be better understood from the following description, when considered in connection with the accompanying drawings, and its scope will be pointed out in the appended claims.

Figure 1:
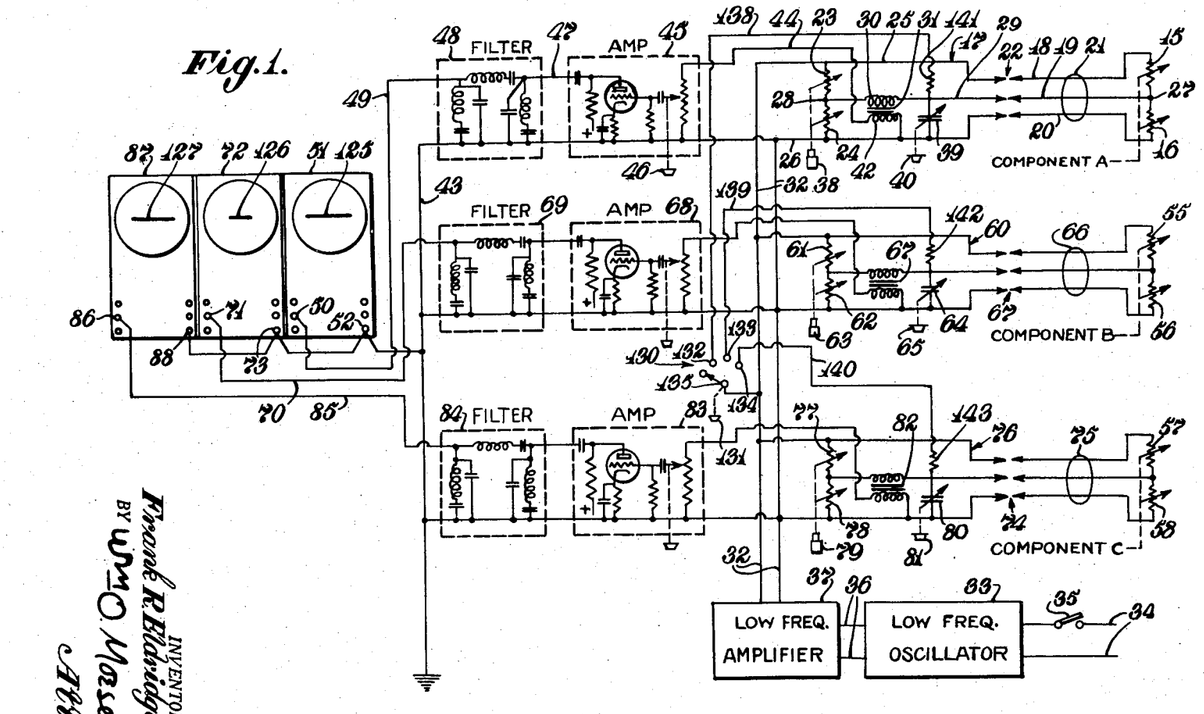
Figure 1 is a schematic circuit diagram of a load measuring system embodying the invention.

Referring to Figure 1, a pair of variable resistance elements 15 and 16, representing a pair of electrical strain gages for example, are arranged to be varied inversely in response to variations in a predetermined force, stress or load component A, presently as indicated by the dotted connection with the arrows shown in connection with each resistor, and hereinafter shown and described.

In accordance with the invention, the resistors 15 and 16 are operated in pairs in connection with any mechanical element on which the load or stress is to be measured, and are so spaced in connection with said element in a plane normal to the load or load component that one is placed in compression while the other is placed in tension and vice versa, thereby being inversely varied in resistance.

The inverse resistance variation provides a push-pull control action which magnifies the resistance variation and serves to vary the balance of a bridge circuit 17 in which the resistors 15 and 16 are connected through extension leads 18, 19, and 20, which may suitably be enclosed in a cable represented at 21 having a plug connection with the remainder of the circuit as indicated at 22.

The bridge circuit 17 further includes a second pair of inversely variable resistors 23 and 24 serially connected between extensions 25 and 26 respectively of the leads 18 and 20. Likewise, the resistors 15 and 16 are serially connected between the leads 18 and 20, and the junctions 27 between the resistors 15 and 16, and 28 between the resistors 23 and 24, are interconnected through the lead 19, an extension 29 thereof, and the primary 30 of a coupling transformer 31.

The resistors 15 and 16 provide two controlling ratio arms for the bridge while the resistors 23 and 24 provide two balancing ratio arms, and the opposite junctions 27 and 28 of the ratio arms in each pair, provide the output terminals for the bridge in connection with the transformer primary 30.

Controllable electrical energy or current from any suitable source is applied to the junctions of the pairs of ratio arms formed by the connections through the leads 18—25 and 20—26 from a pair of supply leads 32 connected with the leads 25 and 26 as shown. In the embodiment of the invention shown, controllable energy is provided through the supply leads 32 from a low frequency generator or oscillator 33 which may be, for example, a 1000 cycle tuning fork oscillator, in turn energized from suitable power supply leads 34 through an operating switch 35. The energy from the oscillator through an output connection 36 may be amplified by a suitable low frequency amplifier indicated at 37 having an output connection with the leads 32.

With suitable modifications in the amplifier circuit, the strain gage bridge may be supplied with a D. C. voltage; 1000 cycle frequency is used in the embodiment of the invention shown because it does not entail the use of an amplifier subject to drift such as a D. C. type. Furthermore, this carrier frequency is far enough removed from 60 cycle hum so that the latter may be removed effectively by filtering.

The balancing resistors 23 and 24 may be similar strain gages or of similar construction to the elements 15 and 16, and may be arranged for inverse resistance variation as indicated by the arrows and the dotted connection with a micrometer adjusting device represented at 38.

In this manner the bridge may be balanced so that the flow of energy from the supply leads 32 or the oscillator source 33, to the opposite junctions of the ratio arms at 27 and 28, is substantially zero. The impedance of the bridge may further be balanced by a suitable variable capacitor 39 connected in parallel with one of the resistance elements such as element 16 for example, between the leads 25 and 29. The capacitor may be varied by a suitable control dial indicated at 40 which is connected therewith as indicated by the dotted connection.

From the foregoing description it will be seen that as the bridge is unbalanced by the inverse resistance variation of the strain gages 15 and 16, the amplitude of the 1000 cycle signal from the supply leads 32 will vary accordingly at the output terminals 27 and 28 of the bridge and will be applied to the primary of the transformer 30, to which is coupled a secondary winding 42 for stepping up the impedance ratio from the bridge circuit 17 and applying the amplified output signal to suitable amplifying and indicating apparatus.

In the present example, the secondary is connected through the lead 26 to a common ground lead 43 for the system, and through an output lead 44 with a suitable variable gain amplifier 45 having an adjustable gain controlling element 46. The amplifier is connected with the lead 26 and the common ground lead 43 as indicated, and is provided with a high potential signal output lead 47 which is connected through a filter 48 and an output signal supply lead 49 with any suitable electrical indicating or recording means represented by the horizontal deflection plate connection 50 of a cathode ray tube or oscilloscope 51. The circuit connection to the oscilloscope is completed through the opposite terminal for the horizontal deflection plates indicated at 52 and the ground lead 43.

Any suitable indicating or recording device may be connected between the control or measuring circuit output lead 49 and ground. For the purpose of visual indication of the extent of the voltage variation from the system, and for recording on film as will hereinafter be described, the oscilloscope is preferred at present. The amplifier 45 serves to raise the output signal amplitude from the bridge control circuit to a level suitable for operating the device 51, and the filter 48, serially connected between the amplifier 45 and the indicating device 51, serves to eliminate all undesired harmonics and spurious oscillations such as 60 cycle oscillations which may be induced in unshielded components of the strain gage bridge and the amplifier 45 and which would otherwise affect the accuracy of the indication.

In the present example, a true sine wave signal is desired at the 1000 cycle frequency, without peaks, and accordingly the filter 48 may be arranged in the form of a band pass filter for 1000 cycles.

The present invention further contemplates the simultaneous measurement or indication of a plurality of related load stresses or components, with respect to a common time axis, and accordingly the system of Figure 1 provides a plurality of control channels or circuits similar to that just described which are arranged for receiving operating control from similar variable impedance or resistance components. In the present system, two other control channels are shown in connection with a pair of variable resistance devices or strain gages 55 and 56 for a second control channel, and a pair of variable resistance devices or strain gages 57 and 58 for a third control channel.

In the second control channel, the resistance elements 55 and 56 are inversely variable in response to a load component B and serve to control the balance of a bridge circuit 60 in which there are connected the balancing resistor elements 61 and 62 inversely controllable by micrometer means 63 and the impedance balance of which is further controlled by a variable capacitor 64 having a control dial indicated at 65. The control resistor elements 55 and 56 are connected through the cable 66 and plug connection 67 with the remainder of the bridge circuit and the signal supply leads 32.

The output of the bridge circuit 60 is taken through the coupling transformer 67, variable gain amplifier 68 and 1000 cycle band pass filter 69 and is applied through output connection lead 70 to one of the horizontal deflection plate terminal 71 of a second cathode ray tube or oscilloscope indicated at 72, representing any suitable indicating or recording device for this channel. The opposite terminal 73 for the horizontal deflection plates is connected to the ground lead 43 as indicated. The operation of the second channel is the same as the first.

As the circuit arrangement and operation of the third control channel is the same as that of the first and second channels, no further description is believed to be necessary, except to point out that the remote connection to the variable resistance strain gages 57 and 58 is made through a cable connection indicated at 75 and a plug connection 74 to a bridge circuit 76 in which the balancing resistors are shown at 77 and 78 and arranged for inverse variable control by means of a micrometer controlled element indicated at 79. The bridge impedance is further matched by the variable capacitor 80 having a control dial 81, and the output of the bridge is taken through the transformer 82, variable gain amplifier 83, 1000 cycle band pass filter 84 and an output connection lead 85 to one of the horizontal plate terminals 86 of a third oscilloscope 87. The opposite horizontal plate terminal 88 is also connected to the ground lead 43 thereby completing the circuit for the third channel. In the third channel it may also be mentioned that the variable resistors or strain gages 57 and 58 are inversely variable in response to a third component or load C. The application of these components from actual machine loadings in operation will be further described with reference to Figures 2 to 6 inclusive to which attention is now directed, and in which like parts throughout are indicated by the same reference numerals.

Figure 2:
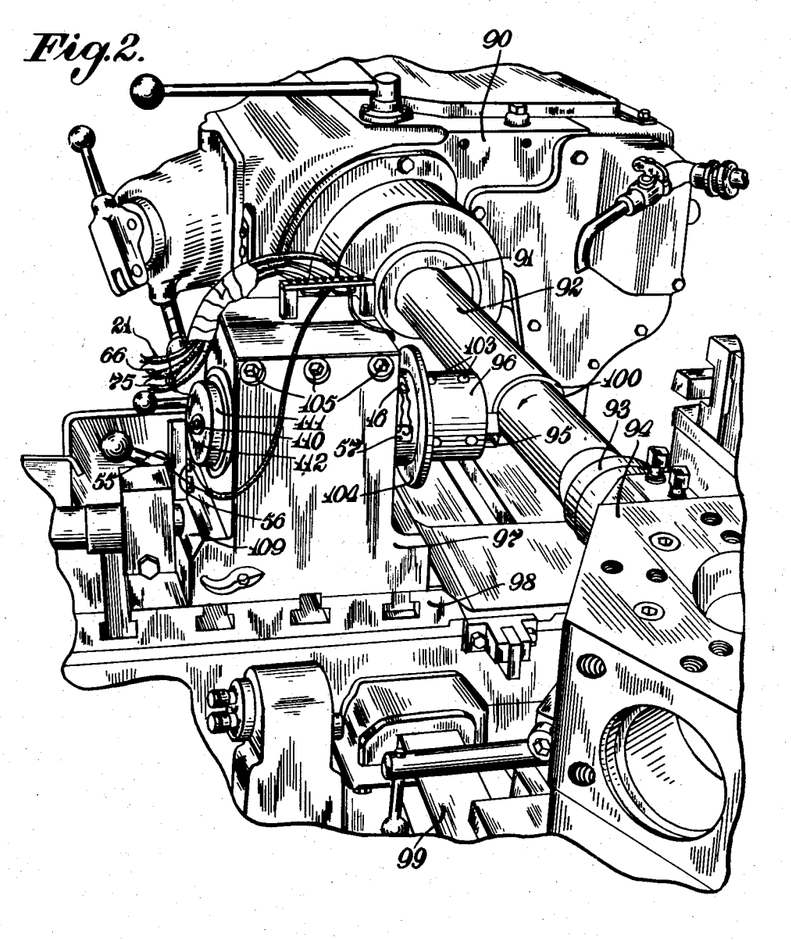
Figure 2 is a view in perspective, on a greatly reduced scale, of a portion of a lathe representing any machine tool or the like, showing a portion of the apparatus of Figure 1 applied thereto in accordance with the invention.

In Figure 2 a lathe or the machine tool 90 is shown which is provided with a motor driven variable speed chuck 91 in which, at one end, is mounted a piece of bar stock or other work to be turned as indicated at 92. The work is supported on a live center 93 mounted in a fixed turret 94, and rotates in the direction indicated by the arrow.

A tool 95 mounted in a tool holder 96 is supported by a rigid clamping block 97 mounted on the cross slide 98 of the lathe, which in turn moves longitudinally of the work 92 on ways 99 to traverse the cut indicated at 100. The depth of the cut is controlled by the radial movement of the cross slide which may be under the control of a hand wheel or the usual traverse and feed mechanism. The invention is not limited, however, to machine tools of the type shown, and as the construction and operation of the lathe shown is well known and understood, further description of the machine tool per se is not believed to be necessary.

For turning and boring operations and the like, the invention generally contemplates the use of a rigid support or clamping block of the type indicated at 97 which is divided longitudinally at the top and chambered to receive and clamp the tool holder 96 rigidly in place so that the tool and tool holder, together with the clamping block, may move as an integral unit with the cross slide 98, the tool 95 being so positioned that its cutting face engages the work 92 substantially radially as shown.

Figures 3, 4, 5, 6:
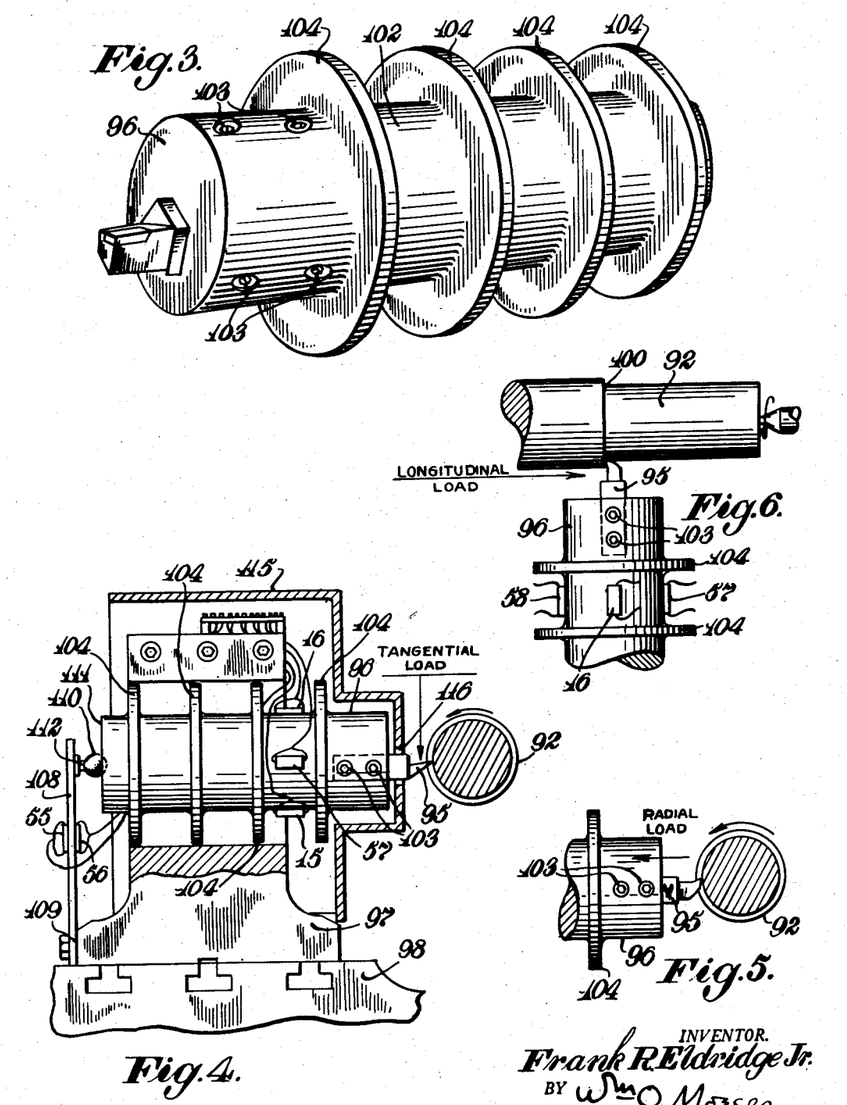
Figure 3 is a view in perspective, of a tool and tool holder of the load measuring arrangement of Figure 2, on an enlarged scale, showing certain constructional details thereof in accordance with the invention.
Figure 4 is a view in elevation, of the tool holding and measuring elements of Figure 2, on the same scale, and partly in cross section, showing further constructional details and a principle of operation thereof in accordance with the invention.
Figures 5 and 6 are fragmentary side and top views respectively, of the tool and tool holding elements of Figure 4 on the same scale, further illustrating a principle of operation thereof.

When so engaged with the work, it will be seen that the tool 95 is subjected to stresses or a loading which may be resolved into a plurality of components, the principle ones of which are the tangential, radial and longitudinal loads as indicated more clearly in Figures 4, 5 and 6. In operation, the radial load or stress is substantially lighter than the longitudinal and tangential loads, and the latter is the greatest under normal conditions. However, when the tool is dull or is not properly formed, the longitudinal load increases sharply and may exceed the tangential load. Furthermore, in certain operations both the longitudinal and the radial loads may be substantially zero or may be negative in character depending upon the angle of the top tool face with respect to the work.

Further, in accordance with the invention, the tool holder 96 as shown more clearly in Figures 3 and 4, for example, comprises an elongated cylindrical body or bar 102 recessed at one end to receive the tool body and provided with suitable clamping screws or bolts indicated at 103 for securing the tool to the tool holder with a high degree of rigidity, whereby all stresses or forces applied to the tool are fully transmitted to the body of the tool holder.

The tool holder is further provided with a plurality of spaced diaphragms 104, the peripheral edges of which engage the wall of the cylindrical chamber or recess in the support or clamping block 97, and are clamped rigidly to the block by means of clamping bolts indicated at 105 in Figure 2 which draw the edges of the cut together tending to close the gap.

In the present example, the diaphragms 104 are made integral with the body of the tool holder 96, and they are of such thickness and depth that a limited radial compliance is provided between the clamp block or support 97 and the tool holder body. The diaphragms normally used are made sufficiently thick to withstand a maximum tool load of the order of 3 tons in any direction. Under these conditions the deflection of the tool point is only approximately .002 of an inch in the direction of the load. The number of diaphragms engaged by the block determines the sensitivity of the system to variations in tool load and is adjusted by varying the number of diaphragms engaged by the support when mounted in place therein. In the present example, 3 diaphragms are engaged, as shown in Figure 4, so that a considerable degree of sensitivity is given to the tool holder and tool at the point of engagement with the work.

The load components, A, B and C as referred to in connection with Figure 1 may be considered as the tangential, radial and longitudinal tool loads or load components respectively. Accordingly, the pairs of strain gages 15—16, 55—56, and 57—58 may be applied to the machine tool arrangement shown, to derive the load measurements in such a manner that they may be translated and indicated as described in connection with the circuit of Figure 1. To this end the strain gages 15 and 16 are secured to the tool holder body at diametrically opposite points in a vertical plane as shown more clearly in Figure 4, while strain gages 57 and 58 are applied to the tool holder body at diametrically opposite points in a horizontal plane as shown more clearly in Figure 6. With the present overhang, these strain gages are applied between the first and second diaphragms as shown.

With this arrangement, strain gages 15 and 16 are located on opposite sides of a plane normal to the tangential load or load component whereby, as the tangential load increases, strain gage 16 tends to become elongated while strain gage 15 tends to become compressed, thereby increasing the resistance of strain gage 16 and decreasing the resistance of strain gage 15. Reduction in the load tends to reduce the extent of the deflections above mentioned so that under no load conditions they may resume substantially a normal unstressed condition.

Likewise, as will be seen from Figure 6, the strain gages 57 and 58 are located on opposite sides of a plane normal to the longitudinal load or load component whereby an increase in the longitudinal load causes strain gage 58 to be extended and strain gage 57 to be compressed thereby, likewise, differentially changing their resistance values, resulting in an increase in the resistance of strain gage 58 and a decrease in the resistance of strain gage 57.

Sensitive bonded type wire strain gages have been used successfully to measure the deflections resulting from the tool loadings indicated. These gages are cemented to the tool holder surface, extending longitudinally of the tool holder as shown, and serve to measure only one of the three loads or load components for each pair or set of gages. The vertical or tangential load on the tool is indicated by the two gages 15 and 16 placed on the top and the bottom of the cutter bar of tool holder and parallel to its axis as above described. A similar set of gages, 57 and 58, on the sides of the bar measure the feed load or longitudinal load as referred to in Figure 6.

The radial or shank load indicated in Figure 5 is determined by the deflections of the strain gages 55 and 56 which are mounted on a cantilever beam or bar 108 on opposite faces thereof as shown more clearly in Figures 2 and 4. The bar is clamped at its lower end 109 to the mounting block or support 97, and its upper or free end is preloaded to move in the direction of the rear end of the tool holder with which it is in alignment. The arrangement is such that the rear end of the tool holder transmits radial thrust to the free end of the lever through a suitable mechanical connection preferably provided as shown in the present example by a small ball bearing 110 seated in the center of the rear face 111 of the tool holder and engaging a hardened and ground contact surface 112 provided on the upper or free end of the cantilever bar 108.

From an inspection of Figures 4 and 5, it will be seen that the diaphragms 104 permit a slight axial movement or deflection of the tool holder which is transmitted to the cantilever bar. This, in turn, flexes the latter and causes compression of strain gage 55 and elongates strain gage 56 thereby inversely varying the resistance values thereof in the manner hereinbefore referred to.

It will be seen that the strain gages 55 and 56 are likewise arranged to lie on opposite sides of a plane passing through the lever 108 which is normal to the direction of the radial load or thrust on the tool. Thus, the control arrangement for the thrust or radial load measuring gages conforms with the operating arrangement provided in connection with the other pairs of strain gages. The entire assembly is mounted on the cross slide and moves as the tool makes its cut. Each pair of strain gages measures only one component of the tool load and is substantially unresponsive to variations in any of the other load components.

While the strain gages are applied to the surfaces of the cantilever and of the tool holder with cement and water-proofed with neoprene patching compound, a cover 115 preferably of sheet metal, is provided to further protect the electrical components from contact with the coolant liquids usually used in connection with certain of the cutting operations of the lathe tool. The cover is shaped as shown in cross section to permit the tool to project through a frontal opening 116 and is generally open at the rear for inspection and to permit wiring connections with the equipment therein. It has been found that precautionary measures are required to prevent the strain gages from becoming dampened, for the reason that a slight moisture content will cause the signal to drift and excessive dampness will cause inaccuracies in the measurement readings.

Figure 7:
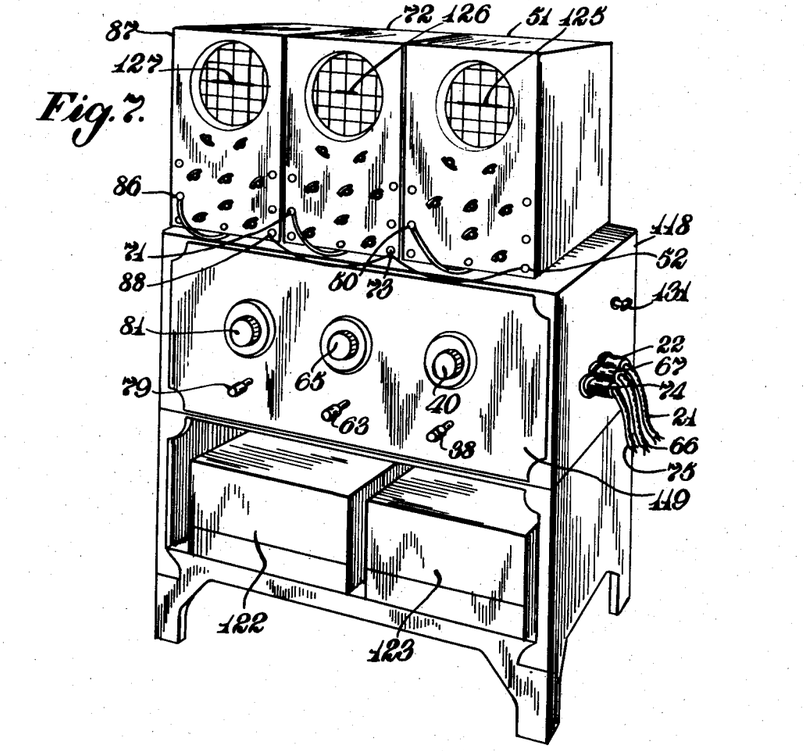
Figure 7 is a view in perspective, of the remainder of the system of Figure 1, showing the mechanical and electrical arrangement of certain translating and indicating apparatus adapted for connection with the components and circuit elements of Figure 2 in accordance with the invention.

Referring now to Figure 7 along with the preceding figures, it will be noted that the three oscilloscopes 87, 72 and 51 may be mounted for viewing at a convenient level on a suitable cabinet 118 which is adapted to contain all the circuit components of Figure 1 other than those which are shown in Figure 2, and that this equipment may be located remotely from the machine tool and may be connected with the controlling strain gage through extension of the cables 21, 66 and 75. As indicated in Figures 1, 2 and 7, these cables plug into the apparatus as indicated at 22, 67 and 74 respectively.

The cabinet 118 is provided with an enclosure having a panel 119 on which are mounted the calibrating dials 40, 65 and 81 for the balancing capacitors 39, 64 and 80 of Figure 1. These are located directly below the oscilloscopes and likewise directly below the dials are located the micrometer screw adjustment means 38, 63 and 79 for balancing the bridge circuits as described in connection with Figure 1.

Figure 8:
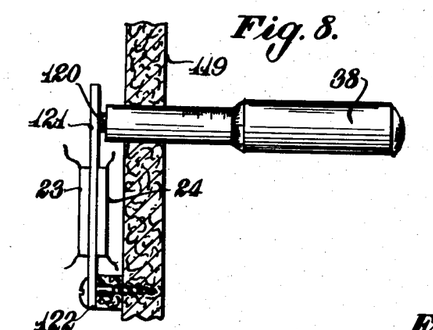
Figure 8 is a view, partly in cross section and substantially full size, of certain circuit components and controlling means therefor, as shown in connection with Figures 1 and 7, illustrating the operation thereof.

A present preferred arrangement for each of the micrometer controls for the bridge balancing strain gages in each circuit is shown in Figure 8, wherein one of the micrometers 38 is shown mounted on the panel 119 and having its movable tip element 120 engaging a strip of flexible material 121 at the rear of the panel, the strip being secured at one end 122, to the panel.

Mounted on opposite sides of the strip at a point intermediate of its ends are the balancing strain gages 23 and 24 which are connected in circuit as shown in Figure 1. As the micrometer head 38 is adjusted, the operating tip or feeler 120 moves in one direction or the other to vary the flexing of the lever 121 thereby inversely varying the resistance of the pair of strain gages 23 and 24 to control the balance of the bridge circuits 17 of Figure 1.

The other bridge circuits are balanced by a similar arrangement of the other corresponding elements therein, the adjustments being facilitated by the mounting arrangement shown in Figure 7. The oscillating generator and low frequency amplifier equipment is also disposed in the stand 118 as indicated at 122 and 123.

The operation of the system is as follows:

With the cables connected between the apparatus shown in Figures 2 and 7 to complete the circuit arrangement of Figure 1, and with the oscilloscopes and amplifier equipment energized, the tool 95 is brought into engagement with the work 92 after the bridge circuits have been properly balanced by adjustment of control dials 40, 65 and 81 and of the bridge balancing strain gages through operation of the micrometer adjustment means 38, 63 and 79 to provide a predetermined zero deflection on the oscilloscope screens.

As the tool engages the work, the radial, longitudinal and tangential loads are applied and correspondingly vary the balance of the three bridge circuits as described in connection with Figure 1 whereupon a signal of corresponding amplitude will be passed through each bridge circuit from the generator and will be applied to the indicating or recording means represented by the oscilloscopes.

As indicated in Figures 1 and 7, the oscilloscope deflections for the tangential, radial and longitudinal loads are represented by the traces indicated at 125, 126 and 127 respectively and the width of the traces in each instance are read with respect to the grid patterns on the oscilloscope faces which may be calibrated in pounds or tons as the case may be, so that each of the load components on the tool may be read by an operator of the equipment.

In order to calibrate the grid pattern of the oscilloscope screen to measure the width of the traces accurately in hundreds of pounds or tons and fractions thereof, the cutting tool 95 is separately preloaded in each of the three mutually perpendicular directions with a predetermined exact amount of pressure at the cutting edge, and the width of the trace for each load is observed. This is the calibration for the indicating means which may be extended by interpolation between two or more of such readings if desired.

In order that it may be repeated at will for one exact reading to correct the amplifier drift or the gain of the circuit from time to time without the preloading operation being repeated, it has been found that a calibration resistor may be connected in each of the control circuits in shunt with one of the ratio arms and may be adjusted in value to give the same deflection of the indicating means as the predetermined load actually applied to the tool in the original calibration. It is obvious that calibration resistors may best be connected in shunt with the bridge resistor which is placed in compression, that is, reduced in resistance, when load is applied to the tool in the direction affecting operation of that circuit so that the same resistance is set up in the bridge circuit by the introduction of the calibration resistor as is caused by the application of the predetermined loading.

A switch for this purpose is indicated at 130 in

Figure 1 and is provided with an operating control handle or knob 131 shown also in Figure 7. This switch may be of the 4-point type having an off position in which it is shown, and three operating contacts 132, 133 and 134 in addition to the movable contact element 135.

In the circuit shown, the movable contact 135 is connected through one of the leads 32 to the lead 25 of the bridge circuit 17 and to the corresponding leads in each of the bridge circuits 60 and 76 whereby it is connected to one terminal of resistors 15, 55 and 57, all of which normally are placed in compression in operation.

Each of the contact points 132, 133 and 134 are connected through leads 138, 139 and 140 and calibration resistors 141, 142 and 143 respectively which are in turn connected respectively with the other terminals of resistors 15, 55 and 57 through the bridge circuit connection for each of said last named resistors.

With this arrangement it will be seen that the calibration resistor 141 may be connected in shunt with the control resistor 15 when the switch 130 is closed to contact point 132 and that in a similar manner calibration resistor 142 may be connected in shunt with the control resistor 55 and the calibration resistor 143 may be connected in shunt with the control resistor 57 when the switch is closed to contact points 133 and 134 respectively.

The resistance values of the resistors 141, 142 and 143 are such that the same output signal indication is derived from each control circuit as would be the case if the predetermined calibrating load were placed upon the tool for actuating the control circuit to produce that indication. With this arrangement, at any time the condition of each control circuit may be checked and the gain therein may be brought back to normal by means of the variable gain control elements of the amplifiers 45, 68 and 83 as shown in Figure 1.

Figure 9:
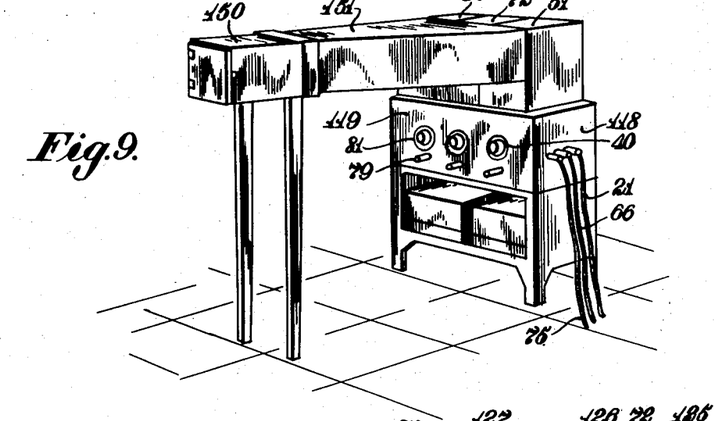
Figure 9 is a view in perspective showing the apparatus of Figure 7 on a reduced scale and provided with photographic recording means.
Figure 10:
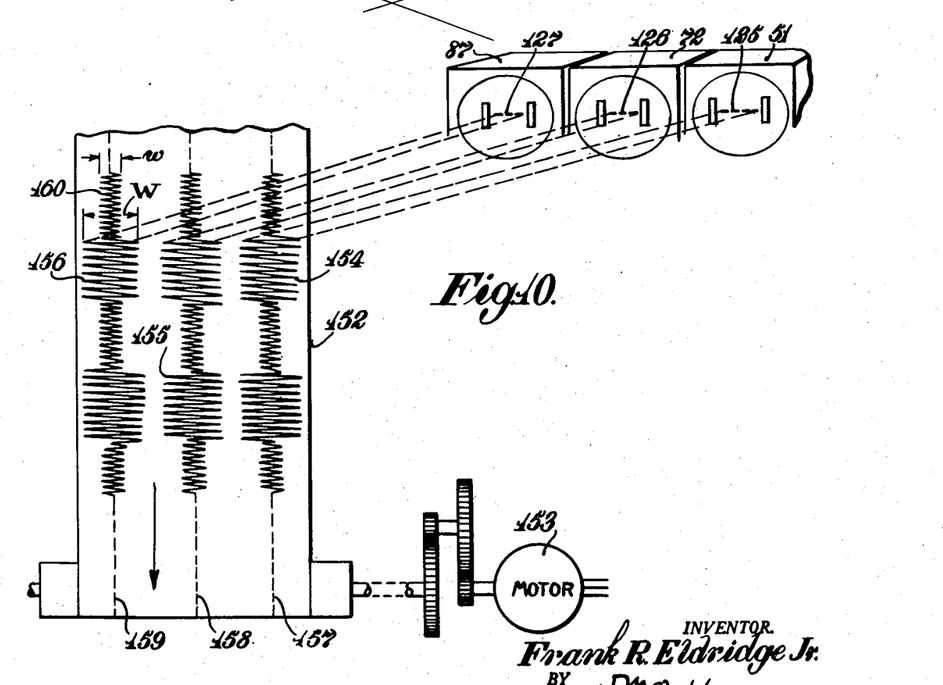
Figure 10 is a schematic mechanical diagram illustrating the arrangement and operation of the recording means of Figure 9 in accordance with the invention.

Referring now to Figures 9 and 10, a method and means are shown for deriving a record of the load variation on the tool of Figure 2 and while other recording means may be provided, this system is now preferred as a means for deriving a record of each load variation with respect to the same time variations of time base. It is desirable to know the relative loading in the three mutually perpendicular directions at any instance so that the relative variations may be determined, and a similar arrangement has been provided for doing this which has given fairly satisfactory results. This is shown in Figures 9 and 10 to which attention is now directed.

It will be seen that a camera 150 is mounted in spaced relation to faces of the oscilloscopes 87, 72 and 51 and connected therewith through an enclosing structure 151 through which the traces 125, 126 and 127 are projected onto the camera film indicated at 152 and arranged to be moved vertically with projected traces at a constant speed. As the film moves under control of suitable constant motor means 153, the three traces 154, 155 and 156 are produced on the film on their respective base lines 157, 158 and 159.

As can be seen on the traces shown, the three loads are recorded simultaneously whereby the instantaneous relative loading may be determined in any point. The width $w$ of the no load base line deflection 160 must be subtracted from a total width $W$ of the trace during a cut in order to obtain a deflection which is proportionable to the tool load at that time. By comparing this deflection with the width of the calibration deflection, the tool load in pounds at any instance may readily be determined by this means.

It should be noted that the width $w$ may be as small as possible. The bridges are carefully balanced before each operation. Continuous and simultaneous recording may then be accomplished by moving the film past the oscilloscope screens in the vertical direction referred to at a predetermined speed or at different speeds as may be required to develop the full outline of each load variation desired. In the present system, the film has given satisfactory records at rates of either 1" per minute or 3" per second if transient effects of material cutting are to be recorded.

Figure 13:
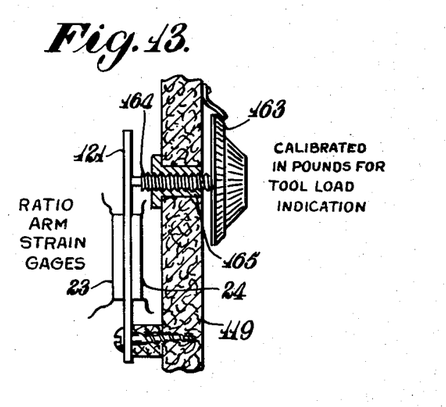
Figure 13 is a view partly in cross section and substantially full size, of a modification of the controlling means of Figure 8, arranged in accordance with the invention.

Other forms of indicating and recording devices may be provided in connection with the system of the present invention as, for example, each of the bridges or any one of them may be balanced under no load conditions by adjustment of the balancing ratio arms, and the amount of adjustment required to return the bridge to balance under a steady load condition may serve as a measure of the load. For example, referring to Figures 8 and 13, the micrometer adjustment means 38 may be replaced as shown in Figure 13 by a calibration dial 163 which carries a threaded stud shank 164 mounting in a suitable sleeve 165 in the panel 119 and arranged to engage and operate the lever 121 in the same manner as in Figure 8 to control the balance of the resistors 23 and 24.

The dial 163 may be rotated to control the tension on the spring lever 121 and may be calibrated in pounds or tons as desired. In either case, the particular bridge or control circuit is balanced by adjusting the tension on the lever 121 until the output of the bridge circuit is substantially zero. This point on the dial 163 is taken as the zero point. The tool is then preloaded by a predetermined amount in pounds or tons and the bridge is again balanced by adjustment of the dials. This point is marked with a reading of the number of pounds to which the tool is then preloaded for calibration purposes. Other points of calibration on the dial may then be provided in the same manner and the entire dial may be calibrated fully by interpolation between the predetermined points. In this manner direct reading of the load for any study may be read on the dial with the bridge balanced.

The change of variation in tool loading in operation may be utilized not only for reading loads or recording the same with respect to time but it may be used to cause a change in the operation of the machine tool itself when the tool loading variation indicates, for example, an energizing condition.

As an example of this feature of the invention, it has been observed that the longitudinal load may increase abruptly upon the failure of the cutting edge of the tool and this increase in load may be utilized to actuate a relay for stopping the motive means which drives the machine tool or the feed mechanism of the tool.

Figure 11:
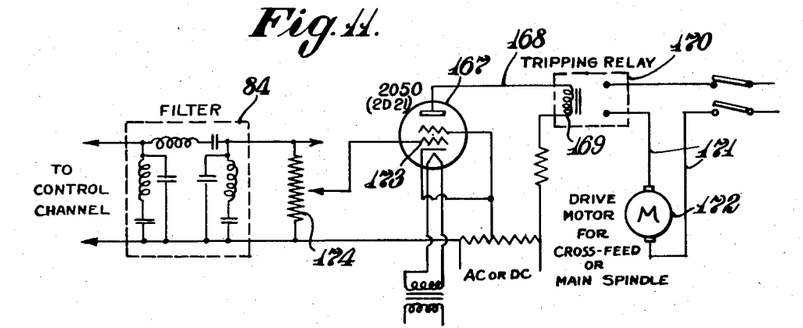
Figure 11 is a schematic diagram of an automatic stop circuit for the machine tool shown in Figure 2 arranged in accordance with the invention.

A circuit arranged for this mode of operation in connection, for example, with the thrust panel and bridge circuit 76 of Figure 1 is shown in Figure 11 to which attention is now directed.

In Figure 11 the output of the bridge circuit through the filter 84 is utilized to trigger a Thyratron 2050 indicated at 167 in the output circuit 168 to which is connected a tripping coil 169 of a suitable relay 170. The relay is connected in the power supply circuit 171 of a driving motor 172 for the cross feed on the main spindle of the machine. The actuating grid 173 of the Thyratron is connected through a potentiometer 174 to the output circuit of the filter 84, and this circuit is adjusted to cause the Thyratron to fire when the output voltage across the filter 84 exceeds a predetermined value corresponding to an excessive tool load, in this case the longitudinal tool load.

Figure 12:
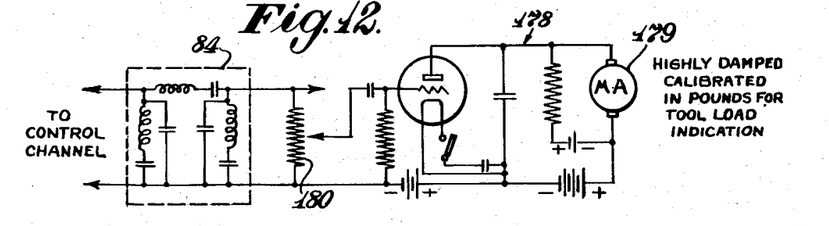
Figure 12 is a schematic circuit diagram of a measuring circuit embodying the invention, and adapted for connection with the system of Figure 1.

Referring now to Figure 12, in a similar manner a vacuum tube volt meter circuit 178 having a calibrated milliammeter 179 may be connected with the output circuit of the filter 84, for example, through a potentiometer connection 180 as shown and the milliammeter 179 may be calibrated to read in pounds or tons as may be desired to provide a direct reading indication of the tool load. In this case the potentiometer 180 is adjusted to cause the milliammeter 179 to assume full scale deflection in respect to the machine tool loads. The milliammeter may then be calibrated in the same manner as wherein above described by means of a definite preloading of the tool in the desired direction with a definite calibration pressure.

While the invention has been shown and described in connection with the operation of a lathe, it may be applied to other machine tools and uses for the measurement of loads and load components in relation to each other and with respect to a common time axis, and for the automatic control of an operation of a machine in response to an overload or stress imparted to an operating element thereof.

I claim:

1. A load measuring system for machine tools and the like, comprising in combination, an elongated work loaded member having a plurality of longitudinally spaced diaphragms, a support for said member adapted to selectively engage and clamp a predetermined number of said diaphragms at the peripheral edges thereof to impart a predetermined rigidity to the work loaded member and a thrust responsive impedance element mounted on said support and engaging said work loaded member whereby it is actuated in response to the flexure of said diaphragms.

2. A load measuring system for machine tools and the like, comprising in combination, an elongated work loaded member having a plurality of longitudinally spaced diaphragms, a support for said member adapted to selectively engage and clamp a predetermined number of said diaphragms at the peripheral edges thereof to impart a predetermined rigidity to the work loaded member, a pair of serially connected variable impedance elements responsive to variations in mechanical stress mounted on said support and engaging said work loaded member to receive an inverse variation in stress in response to the work load applied to said member to flex said diaphragms whereby the impedances of said elements are inversely varied, a second pair of serially connected variable impedance elements connected with said first pair to provide a balanced electrical bridge circuit of which said first and second pairs of elements are the ratio and balancing arms respectively, means for inversely varying said second pair of impedance elements to effect a balance in the bridge circuit, means for passing electrical energy through said bridge circuit, and calibrated means for measuring the electrical output of the bridge circuit as a measure of the loading applied to said member.

3. A load measuring system for machine tools and the like, comprising in combination, an elongated work loaded member having a plurality of longitudinally spaced diaphragms, a support for said member adapted to selectively engage and clamp a predetermined number of said diaphragms at the peripheral edges thereof to impart a predetermined rigidity to the work loaded member, a bridge circuit including a pair of serially connected variable impedance elements responsive to variations in mechanical stress mounted on said support and engaging said work loaded member to receive an inverse variation in stress in response to the work load applied to said member in a predetermined direction whereby the impedances of said elements are inversely varied, means for passing electrical energy through said bridge circuit, and calibrated means for measuring the electrical output of the bridge circuit as a measure of the loading applied to said member in response to inverse variation of the impedances of said impedance elements, said last named means comprising an oscilloscope providing a calibrated scale deflection proportional to the loading, and a photographic recording film exposed thereto and moving at a predetermined rate of speed in a direction substantially perpendicular to the direction of the scale deflection of the oscilloscope, thereby to measure the magnitude and time duration of the loading.

4. In a machine tool for turning, boring and the like, the combination with a tool element, of a tool holder having an elongated cylindrical body portion and a plurality of integral longitudinally spaced circular diaphragms thereon, a rigid support having a recess for receiving said tool holder and clamping a plurality of said diaphragms at the peripheral edges thereof to support the tool holder with a predetermined degree of rigidity, a pair of electrical strain gages secured to the body of the tool holder at substantially diametrically opposite points and in a plane normal to a tool load component to be measured, whereby said gages are tensioned and compressed inversely by variations in said load component, a flexible plate mechanically connected with the tool holder to flex variably in response to variations in a second tool load component producing longitudinal thrust on the tool holder, a second pair of electrical strain gages mounted on opposite sides of said plate whereby said gages are inversely tensioned and compressed by variations in said second load component, an electrical balanced bridge circuit for each of said pairs of strain gages in which said gages are connected as inversely variable ratio arms, whereby each of said bridge circuits is unbalanced proportionally to said tool load component variations, means for applying a low frequency alternating current to said bridge circuits in parallel simultaneously, means for deriving from each of said bridge circuits a portion of said current corresponding to the degree of unbalance thereof, and calibrated electrical means for translating said derived currents into measurements for each of said load components.

5. In a machine tool for turning, boring and the like, the combination with a tool element, of a tool holder having an elongated cylindrical body portion and a plurality of integral longitudinally spaced circular diaphragms thereon, a rigid support having a recess for receiving said tool holder and clamping a plurality of said diaphragms at the peripheral edges thereof to support the tool holder with a predetermined degree of rigidity, a pair of electrical strain gages secured to the body of the tool holder at substantially diametrically opposite points and in a plane normal to a tool load component to be measured, whereby said gages are tensioned and compressed inversely by variations in said load component, a flexible plate mechanically connected with the tool holder to flex variably in response to variations in a second tool load component providing longitudinal thrust on the tool holder, a second pair of electrical strain gages mounted on opposite sides of said plate whereby said gages are inversely tensioned and compressed by variations in said second load component, an electrical balanced bridge circuit for each of said pairs of strain gages in which said gages are connected as inversely variable ratio arms, whereby each of said bridge circuits is unbalanced proportionally to said tool load component variations, means for applying a low frequency alternating current to said bridge circuits in parallel simultaneously, means for deriving from each of said bridge circuits a portion of said current corresponding to the degree of unbalance thereof, and calibrated electrical means for translating said derived currents into load measurements for each of said load components, and means for recording said load measurements simultaneously with respect to a common time axis.

6. In a machine tool for turning, boring and the like, the combination with a tool element, of a tool holder having an elongated cylindrical body portion and a plurality of integral longitudinally spaced circular diaphragms thereon, a rigid support having a recess for receiving said tool holder and clamping a plurality of said diaphragms at the peripheral edges thereof to support the tool holder with a predetermined degree of rigidity, a pair of electrical strain gages secured to the body of the tool holder at substantially diametrically opposite points and in a plane normal to a tool load component to be measured, whereby said gages are tensioned and compressed inversely by variations in said load component, a flexible plate mechanically connected with the tool holder to flex variably in response to variations in a second tool load component providing longitudinal thrust on the tool holder, a second pair of electrical strain gages mounted on opposite sides of said plate whereby said gages are inversely tensioned and compressed by variations in said second load component, an electrical balanced bridge circuit for each of said pairs of strain gages in which said gages are connected as inversely variable ratio arms, whereby each of said bridge circuits is unbalanced proportionally to said tool load component variations, means for applying a low frequency alternating current to said bridge circuits in parallel simultaneously, means for deriving from each of said bridge circuits a portion of said current corresponding to the degree of unbalance thereof, and calibrated electrical means for translating said derived currents into load measurements for each of said load components, and electrical means responsive to a predetermined magnitude of derived current from one of said bridge circuits for changing a condition of operation of the tool element.

7. In a machine tool for turning, boring and the like, the combination with a tool element, of a tool holder having an elongated cylindrical body portion and a plurality of integral longitudinally spaced circular diaphragms thereon, a rigid support having a recess for receiving said tool holder and clamping a plurality of said diaphragms at the peripheral edges thereof to support the tool holder with a predetermined degree of rigidity, a pair of electrical strain gages secured to the body of the tool holder at substantially diametrically opposite points and in a plane normal to a tool load component to be measured, whereby said gages are tensioned and compressed inversely by variations in said load component, a flexible plate mechanically connected with the tool holder to flex variably in response to variations in a second tool load component providing longitudinal thrust on the tool holder, a second pair of electrical strain gages mounted on opposite sides of said plate whereby said gages are inversely tensioned and compressed by variations in said second load component, an electrical balanced bridge circuit for each of said pairs of strain gages in which said gages are connected as inversely variable ratio arms, whereby each of said bridge circuits is unbalanced proportionally to said tool load component variations, means for applying a low frequency alternating current to said bridge circuits in parallel simultaneously, means for deriving from each of said bridge circuits a portion of said current corresponding to the degree of unbalance thereof, and calibrated electrical means for translating said derived currents into load measurements for each of said load components, and calibrating means including an impedance element selectively connectable into said bridge circuits to produce an unbalance corresponding to a known tool load.

8. In a machine tool for turning, boring and the like, the combination with a tool element, of a tool holder having an elongated cylindrical body portion and a plurality of integral longitudinally spaced circular diaphragms thereon, a rigid support having a recess for receiving said tool holder and clamping a plurality of said diaphragms at the peripheral edges thereof to support the tool holder with a predetermined degree of rigidity, a pair of electrical strain gages secured to the body of the tool holder at substantially diametrically opposite points and in a plane normal to a tool load component to be measured, whereby said gages are tensioned and compressed inversely by variations in said load component, a flexible plate mechanically connected with the tool holder to flex variably in response to variations in a second tool load component providing longitudinal thrust on the tool holder, a second pair of electrical strain gages mounted on opposite sides of said plate whereby said gages are inversely tensioned and compressed by variations in said second load component, an electrical balanced bridge circuit for each of said pairs of strain gages in which said gages are connected as inversely variable ratio arms, whereby each of said bridge circuits is unbalanced proportionally to said tool load component variations, means for applying a low frequency alternating current to said bridge circuits in parallel simultaneously, means for deriving from each of said bridge circuits a portion of said current corresponding to the degree of unbalance thereof, and calibrated electrical means for translating said derived currents into load measurements for each of said load components, and means for balancing the bridge circuits comprising similar pairs of strain gages connected in the bridge circuits as balancing arms and means for inversely varying the tension and compression to inversely vary the resistance in the arms.

9. A tool holder for a machine tool load measuring system comprising an elongated cylindrical body portion, a plurality of integral longitudinally spaced diaphragms on said body portion, the planes of said diaphragms being substantially perpendicular to the axis of said body portion, a rigid supporting member having a recess for receiving said tool holder and means for clamping a selected number of said diaphragms at the peripheral edges thereof within said recess to support said tool holder with a predetermined degree of rigidity.

FRANK R. ELDRIDGE, Jr.

REFERENCES CITED

The following references are of record in the file of this patent:

UNITED STATES PATENTS

| Number | Name | Date |
| --- | --- | --- |
| 1,637,676 | Bohuszewicz | Aug. 2, 1927 |
| 2,228,902 | Allen | Jan. 14, 1941 |
| 2,321,322 | Ruge | June 8, 1943 |
| 2,329,541 | Kuehni | Sept. 14, 1943 |
| 2,393,669 | Wheaton et al. | Jan. 29, 1946 |

FOREIGN PATENTS

| Number | Country | Date |
| --- | --- | --- |
| 532,045 | Germany | Sept. 23, 1932 |

OTHER REFERENCES

"Measurement of Stresses in Rotating Shafts," in Electronics, July 1945, pages 114–122.